(12) United States Patent
Yamawaki et al.

(10) Patent No.: US 10,879,834 B2
(45) Date of Patent: Dec. 29, 2020

(54) TEMPERATURE MONITORING DEVICE, TEMPERATURE MONITORING METHOD, INFORMATION PROCESSING PROGRAM AND RECORDING MEDIUM

(71) Applicant: OMRON Corporation, Kyoto (JP)

(72) Inventors: Satoshi Yamawaki, Ritto (JP); Takao Ushiyama, Ritto (JP); Kentaro Hirao, Takatsuki (JP)

(73) Assignee: OMRON Corporation, Kyoto (JP)

( * ) Notice: Subject to any disclaimer, the term of this patent is extended or adjusted under 35 U.S.C. 154(b) by 430 days.

(21) Appl. No.: 15/381,113

(22) Filed: Dec. 16, 2016

(65) Prior Publication Data
US 2017/0264233 A1   Sep. 14, 2017

(30) Foreign Application Priority Data
Mar. 11, 2016 (JP) .................. 2016-048955

(51) Int. Cl.
| | |
|---|---|
| H02P 29/68 | (2016.01) |
| H02P 29/60 | (2016.01) |
| H02P 29/66 | (2016.01) |
| G01K 17/00 | (2006.01) |
| G01N 25/72 | (2006.01) |
| G05B 19/18 | (2006.01) |

(52) U.S. Cl.
CPC .............. *H02P 29/68* (2016.02); *G01K 17/00* (2013.01); *G01N 25/72* (2013.01); *H02P 29/60* (2016.02); *H02P 29/666* (2016.11); *G05B 19/18* (2013.01); *G05B 2219/31455* (2013.01)

(58) Field of Classification Search
CPC . H02H 6/00; H02P 29/68; H02P 29/60; H02P 29/666; G01K 17/00; G01N 25/72; G05B 19/18; G05B 2219/31455
See application file for complete search history.

(56) References Cited

U.S. PATENT DOCUMENTS 5,373,205 A * 12/1994 Busick .................... H02H 6/00
                                                       307/116
9,496,817 B1 * 11/2016 Lepka .................... H02P 29/60
(Continued)

FOREIGN PATENT DOCUMENTS

| CN | 104332954 | 2/2015 |
| CN | 104660133 | 5/2015 |

(Continued)

OTHER PUBLICATIONS

"Office Action of China Counterpart Application," dated Jan. 2, 2019, with English translation thereof, p. 1-p. 17.
(Continued)

*Primary Examiner* — Kyle R Quigley
(74) *Attorney, Agent, or Firm* — JCIPRNET (57) ABSTRACT

A temperature monitoring device of the present invention includes: a current value acquisition portion (50) that acquires a current value supplied for the motor; a calorific value inference portion (20) that infers a calorific value through a first thermal model indicating a relationship between the current value and a calorific value of a servo driver (2); and an anomaly judgment portion (10) that compares the calorific value with a threshold, so as to judge whether there is heating anomaly.

8 Claims, 4 Drawing Sheets

(56) References Cited

U.S. PATENT DOCUMENTS

| | | | |
|---|---|---|---|
| 2005/0077890 A1* | 4/2005 | Rannow | G01K 7/36 324/117 R |
| 2005/0162113 A1 | 7/2005 | Fujimoto et al. | |
| 2006/0250154 A1 | 11/2006 | Gao et al. | |
| 2012/0007532 A1 | 1/2012 | Baglino et al. | |

FOREIGN PATENT DOCUMENTS

| | | |
|---|---|---|
| DE | 102011000267 | 8/2011 |
| DE | 102012200199 | 7/2013 |
| JP | S537284 | 1/1978 |
| JP | H04347594 | 12/1992 |
| JP | H05284755 | 10/1993 |
| JP | H1159444 | 3/1999 |
| JP | 2002252995 | 9/2002 |
| JP | 2005218197 | 8/2005 |
| JP | 2006296165 | 10/2006 |
| JP | 2012175891 | 9/2012 |
| JP | 2014168340 | 9/2014 |
| JP | 2015176319 | 10/2015 |
| WO | 02084855 | 10/2002 |

OTHER PUBLICATIONS

"Office Action of Japan Counterpart Application," dated Aug. 21, with English translation thereof, 2018, p. 1-p. 9.

"Search Report of Europe Counterpart Application", dated Jul. 21, 2017, p. 1-p. 8, in which the listed references were cited.

* cited by examiner

TEMPERATURE MONITORING DEVICE, TEMPERATURE MONITORING METHOD, INFORMATION PROCESSING PROGRAM AND RECORDING MEDIUM

CROSS REFERENCE TO RELATED APPLICATIONS

This application claims the priority benefit of Japanese Patent Application No. 2016-048955, filed on Mar. 11, 2016. The entirety of the above-mentioned patent application is hereby incorporated by reference herein and made a part of this specification.

BACKGROUND OF THE INVENTION

1. Field of the Invention

The present invention relates to a temperature monitoring device that monitors a temperature of a motor control device that controls an action of a motor and the like.

2. Description of Related Art

In the past, in order to make overheating protection over a motor, a servo driver that controls the motor and the like used in machine tools, many methods are taken into account. For example, a manner is disclosed in Patent Document 1: detecting a current value given to a motor, and comparing the current value with a threshold to limit the current given to the motor, thus making overheating protection over the motor. Moreover, a method is disclosed in Patent Document 2: detecting a current value given to a motor, inferring heat of constitutive elements of the motor based on a thermal model indicating a relationship between the current value and heating/heat dissipation of parts of the motor, and making overheating protection over the motor by comparing the heat with a threshold.

PRIOR ART DOCUMENTS

Patent Documents

Patent Document 1: Japanese Patent Publication Gazette No. 2005-218197 (published on Aug. 11, 2005)
Patent Document 2: Japanese Patent Publication Gazette No. 2012-175891 (published on Sep. 10, 2012)

However, the former technologies have the following problems. In the manner disclosed in Patent Document 1, a heat absorbing portion that receives heat from a heating portion has never been considered. Thus, overheating protection that takes the entirety into account such as a frame of a motor or a control device (servo driver) of a motor cannot be achieved.

Moreover, in the manner disclosed in Patent Document 2, it is overheating protection of a three-phase AC motor, the control device of the motor is not considered, and overheating protection that takes the entirety into account cannot be achieved.

SUMMARY OF THE INVENTION

The present invention provides a temperature monitoring device and the like that can achieve entire overeating protection over a system including a motor and a control device.

To solve the problem, the temperature monitoring device of the present invention monitors a temperature of a motor control device that controls an action of a motor, wherein the temperature monitoring device includes: a current value acquisition portion that acquires a current value supplied for the motor; a calorific value inference portion that infers a calorific value of the motor control device through a first thermal model as a first calorific value, the first thermal model indicating a relationship between the current value and the calorific value of the motor control device; and an anomaly judgment portion that compares the first calorific value inferred by the calorific value inference portion with a specified first threshold, so as to judge whether the motor control device has heating anomaly.

In the structure, based on the current value supplied for the motor, a calorific value of the motor control device is inferred as a first calorific value through the first thermal model. Moreover, whether the motor control device has heating anomaly is judged based on the inferred first calorific value.

Herein, the current value supplied for the motor is a value desired for the control over the motor, and thus it is unnecessary to otherwise set a structure that acquires the current value. That is, a calorific value of the motor control device can be inferred without otherwise setting a structure such as a temperature sensor that measures the calorific value of the motor control device, to detect heating anomaly.

Moreover, the heating anomaly of the motor control device is detected, and thus, for example, in the case of a motor control device supporting multiple motors, no matter which motor is connected, the heating anomaly of the motor control device can be detect, so as to prevent occurrence of a trouble.

In the temperature monitoring device of the present invention, the calorific value inference portion further infers a calorific value of the motor through a second thermal model as a second calorific value, the second thermal model indicating a relationship between the current value and the calorific value of the motor, and the anomaly judgment portion compares the second calorific value inferred by the calorific value inference portion with a specified second threshold, so as to further judge whether the motor has heating anomaly.

In the structure, based on the current value supplied for the motor, a calorific value of the motor can be further inferred as a second calorific value through the second thermal model. Moreover, whether the motor has heating anomaly is further judged based on the inferred second calorific value.

Thus, in addition to the heating anomaly of the motor control device, heating anomaly of the motor can also be detected, and thus entire temperature monitoring on a motor control system including a motor and a motor control device can be achieved, so as to prevent occurrence of a trouble.

In the temperature monitoring device of the present invention, the temperature monitoring device is disposed in the motor control device.

In the structure, the temperature monitoring device of the present invention is disposed in the motor control device. In the motor control device, as the current value supplied for the motor is acquired based on motor control, it is unnecessary to otherwise set a current value acquisition portion. Moreover, the anomaly judgment may also be achieved by using an operation processing portion that the motor control device has. That is, the temperature monitoring device of the present invention can be achieved relatively easily.

Moreover, even if heating anomaly occurs, countermeasures such as stopping the action of the motor by using a function as the motor control device can be taken.

The temperature monitoring device of the present invention may further include: an output portion that outputs information generated by heating anomaly when the anomaly judgment portion judges that the heating anomaly exists.

According to the structure, in the case that heating anomaly occurs, the intention can be output to the outside. Therefore, for example, a manager of the motor control system can really realize occurrence of an abnormal event.

In the temperature monitoring device of the present invention, the current value acquisition portion acquires the current value according to a measured value obtained by measuring a power line through which the motor control device supplies power for the motor.

According to the structure, the current value is acquired according to a measured value obtained by measuring a power line. Therefore, for example, inference accuracy of the calorific value can be improved upon comparison with a structure of acquiring the current value according to an instruction value that indicates the current value supplied for the motor by the motor control device.

In the temperature monitoring device of the present invention, a cycle of acquiring the current value by the current value acquisition portion is shorter than that of making judgment in the anomaly judgment portion.

In the structure, in order to consider influences of instant variation of the current value, the shorter the cycle of acquiring the current value by the current value acquisition portion, the better. On the other hand, the operation processing for judgment in the anomaly judgment portion is complicated. Herein, according to the structure, the cycle of acquiring the current value by the current value acquisition portion can be set as a degree to which the influences of instant variation of the current value can be considered, and the cycle of making judgment in the anomaly judgment portion may be set as a degree to which the complicated operation processing can be performed.

In the temperature monitoring device of the present invention, the specified first threshold is divided into multiple stages, and the anomaly judgment portion judges whether the motor control device has heating anomaly in each stage.

According to the structure, the specified first threshold is divided into multiple stages, whether there is heating anomaly is judged in each stage, and thus the heating anomaly to which degree can be grasped.

In the temperature monitoring device of the present invention, the first thermal model includes: a thermal model of a current value detection resistance portion in the motor control device, and a thermal model of a substrate portion disposed around the current value detection resistance portion.

According to the structure, the following thermal model is used. The thermal model not only considers heating of the current value detection resistance portion, but also considers heating of the substrate portion around whose temperature rises due to the heating of the current value detection resistance portion. Thus, the heating condition in the motor control device can be inferred with better accuracy.

In the temperature monitoring device of the present invention, the second thermal model includes: a thermal model of a winding portion in the motor, and a thermal model of a frame portion of the motor.

According to the structure, the following thermal model is used. The thermal model not only considers heating of the winding portion, but also considers heating of the frame portion whose temperature rises due to the heating of the winding portion. Thus, the heating condition in the motor can be inferred with better accuracy.

The temperature monitoring method of the present invention monitors a temperature of a motor control device that controls an action of a motor, wherein the temperature monitoring method includes: a current value acquisition step of acquiring a current value supplied for the motor; a calorific value inference step of inferring a calorific value of the motor control device through a first thermal model as a first calorific value, the first thermal model indicating a relationship between the current value and the calorific value of the motor control device; and an anomaly judgment step of comparing the first calorific value inferred in the calorific value inference step with a specified first threshold, so as to judge whether the motor control device has heating anomaly.

The temperature monitoring device of the present invention in various forms can also be achieved with a computer. At this point, a control program of a temperature monitoring device that achieves the temperature monitoring device with a computer and a recording medium recording the control program and computer-readable also belong to the category of the present invention by causing the computer to act as the portions (software elements) of the temperature monitoring device.

According to the present invention, based on the current value supplied for the motor, a calorific value of the motor control device is inferred as a first calorific value through the first thermal model. Moreover, whether the motor control device has heating anomaly is judged based on the inferred first calorific value. Herein, the current value supplied for the motor is a value desired for the control over the motor, and thus it is unnecessary to otherwise set a structure that acquires the current value. That is, a calorific value of the motor control device can be inferred without otherwise setting a structure such as a temperature sensor that measures the calorific value of the motor control device, to detect heating anomaly.

Moreover, the heating anomaly of the motor control device is detected, and thus, the following effects are produced, that is, for example, in the case of a motor control device supporting multiple motors, no matter which motor is connected, the heating anomaly of the motor control device can be detect, so as to prevent occurrence of a trouble.

DESCRIPTION OF THE EMBODIMENTS

[Profile of a Control System]

Figure 1:
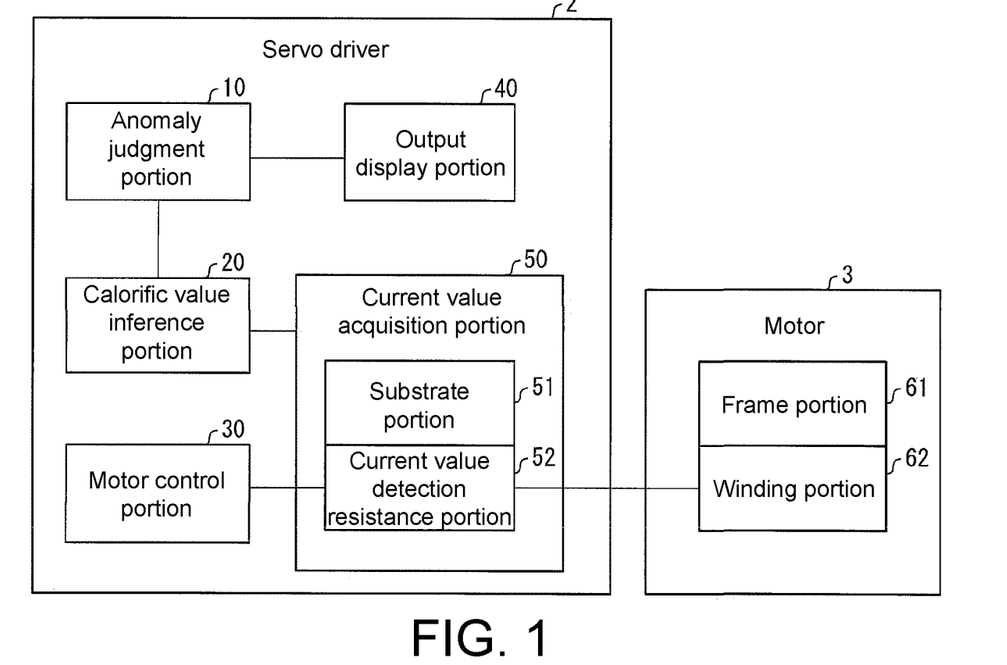
FIG. 1 is a structural block diagram of main parts of a servo driver according to this embodiment.
Figure 2:
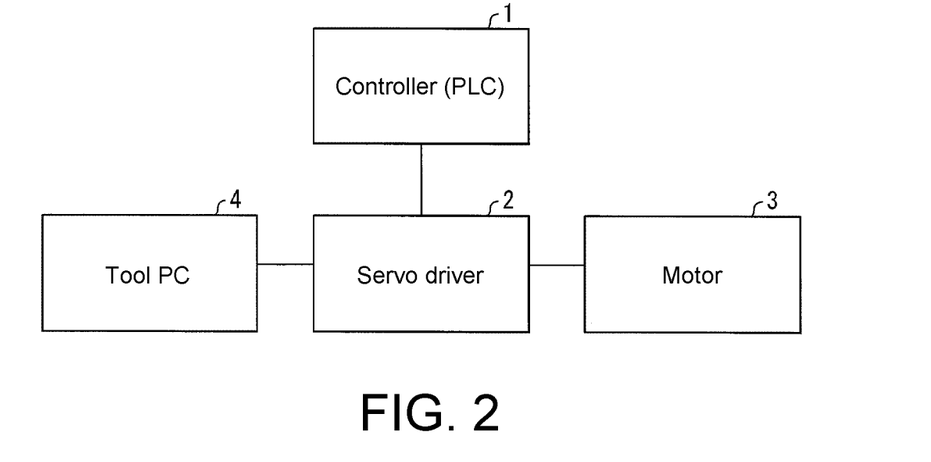
FIG. 2 is a diagram of a profile of a control system according to this embodiment.

In the following, embodiments of the present invention are described based on FIG. 1 to FIG. 5. Firstly, a control system of this embodiment is described with reference to FIG. 2. FIG. 2 is a diagram of a profile of a control system according to this embodiment. The control system uses a servo mechanism to control an action of a load device, which, as shown in FIG. 2, includes a controller (Programmable Logic Controller (PLC)) 1, a servo driver (motor control device, temperature monitoring device) 2, a motor 3 and a tool personal computer (PC) 4.

The controller (PLC) 1 controls a system including the servo driver 2 entirely.

The servo driver 2 stores a control parameter set and adjusted through the controller 1 or the tool PC 4 described later, and drives the motor 3 according to the control parameter, to cause the load device to act.

Moreover, the servo driver 2 monitors temperatures of the servo driver 2 and the motor 3, and displays anomaly if anomaly such as overheating exists. In addition, in this embodiment, as a motor control device, a structure that uses a servo driver 2 taking control over a servo motor (motor 3) is disclosed, but as a motor control device, an inverter that takes control over an induction motor may also be used.

Moreover, the servo driver 2 is communicably connected with the controller 1 and the motor 3 in a wired or wireless way. For example, the servo driver 2 is connected with the controller 1 via a field network such as an EtherCAT (Ethernet for Control Automation Technology, registered trademark), and the servo driver 2 and the motor 3 are connected through a dedicated cable.

The tool PC 4 is a device for setting and adjusting a control parameter of the servo driver 2, including software for adjustment. The tool PC 4, for example, is achieved through a personal computer, and by executing a program (software for adjustment) stored in the personal computer, the computer functions as the tool PC 4.

Moreover, the tool PC 4 and the servo driver 2 are connected through a Universal Serial Bus (USB) cable or the like.

[Structure of the Servo Driver]

Next, the structures of main parts of the servo driver 2 and the motor 3 are described with reference to FIG. 1. FIG. 1 is a structural block diagram of main parts of the servo driver 2.

As shown in FIG. 1, the servo driver 2 includes an anomaly judgment portion 10, a calorific value inference portion 20, a motor control portion 30, an output display portion 40 and a current value acquisition portion 50.

The anomaly judgment portion 10 compares the calorific value (inferred calorific value) inferred by the calorific value inference portion 20 with a threshold, when the inferred calorific value exceeds the threshold, judges that there is anomaly (heating anomaly), and notifies the output display portion 40 of the intention. In addition, details of the anomaly judgment processing will be described later.

The calorific value inference portion 20 infers the calorific value according to a current value acquired from the current value acquisition portion 50, and notifies the anomaly judgment portion 10 of the calorific value. In addition, details of the inference of the calorific value will be described later.

The motor control portion 30 controls the motor 3 by controlling the current value supplied for the motor 3.

The output display portion 40 displays the intention when the anomaly judgment portion 10 judges that it is anomaly. In addition, the output display portion 40 displays the intention not only in the case of anomaly but also in the case of normal, and can also display the calorific value inferred by the calorific value inference portion 20. Moreover, the calorific value may also be displayed by color separation according to normal or anomaly.

Moreover, the anomaly may not be displayed in the servo driver, but is output and displayed in an external device (e.g., the tool PC 4).

The current value acquisition portion 50 includes a substrate portion 51 and a current value detection resistance portion 52, they are used to acquire the current value supplied for the motor 3 by the motor control portion 30 from a power line supplying power for the motor 3, and notify the calorific value inference portion 20 of the current value.

The motor 3 includes a frame portion 61 and a winding portion 62.

[Details of the Servo Driver]

Figure 3:
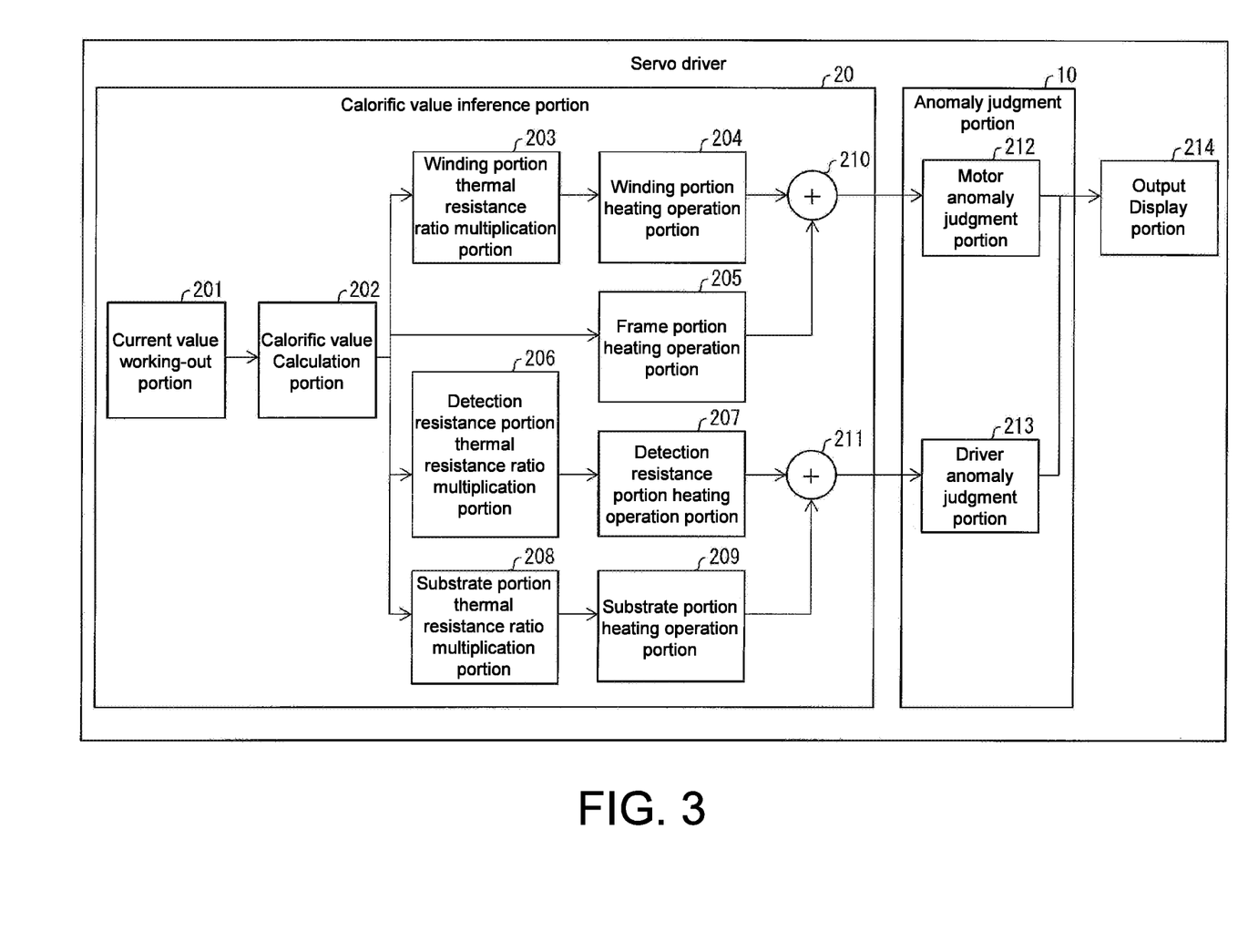
FIG. 3 is a block diagram of details of the servo driver.

Next, details of the calorific value inference portion 20 and the anomaly judgment portion 10 of the servo driver 2 are described with reference to FIG. 3. FIG. 3 is a block diagram of details of the calorific value inference portion 20 and the anomaly judgment portion 10 of the servo driver 2.

As shown in FIG. 3, the calorific value inference portion 20 includes a current value working-out portion 201, a calorific value calculation portion 202, a winding portion thermal resistance ratio multiplication portion 203, a winding portion heating operation portion 204, a frame portion heating operation portion 205, a detection resistance portion thermal resistance ratio multiplication portion 206, a detection resistance portion heating operation portion 207, a substrate portion thermal resistance ratio multiplication portion 208 and a substrate portion heating operation portion 209.

Moreover, the anomaly judgment portion 10 includes a motor anomaly judgment portion 212 and a driver anomaly judgment portion 213. Moreover, a processing cycle of the anomaly judgment portion 10, for example, is 100 Hz, which is longer than a cycle of acquiring the current value by the current value working-out portion 201. By shortening the cycle of acquiring the current value, an instant peak can also be acquired, and by lengthening the cycle of the anomaly judgment processing, the anomaly judgment processing requiring complicated operations can be achieved without using a high-speed operation portion beyond the necessity.

The current value working-out portion 201 imports the current value acquired from the current value acquisition portion 50 with a specified cycle (e.g., 16 kHz), for example, it works out an effective current by working out the square root of the current amplitude value, and notifies the calorific value calculation portion 202 of the effective current.

The calorific value calculation portion 202 standardizes the current value worked out by the current value working-out portion 201. The standardization, for example, is performed by dividing the square root of the rated current.

The calorific value inference portion 20 is divided into a part related to the motor 3 and a part related to the servo driver 2 to infer the calorific value. Moreover, the part related to the motor 3 is further divided into a winding portion 62 and a frame portion 61 to work out the calorific value and perform summation. This is undertaken by the winding portion thermal resistance ratio multiplication portion 203, the winding portion heating operation portion 204, the frame portion heating operation portion 205 and an addition portion 210 shown in FIG. 3.

The winding portion thermal resistance ratio multiplication portion 203 multiplies the current value worked out by the current value working-out portion 201 by a winding portion thermal resistance ratio, and notifies the winding portion heating operation portion 204 of the result. The so-called winding portion thermal resistance ratio refers to a ratio of the winding portion to the frame portion.

The winding portion heating operation portion 204 works out a calorific value of the winding portion 62 according to the current value obtained by multiplying the winding portion thermal resistance ratio. More specifically, the calorific value is worked out by using a thermal model (a second thermal model, a winding portion thermal model) indicating a relationship between the current value and the calorific value of the winding portion 62.

The frame portion heating operation portion 205 works out a calorific value of the frame portion 61 according to the current value notified from the calorific value calculation portion 202. More specifically, the calorific value is worked out by using a thermal model (a second thermal model, a frame portion thermal model) indicating a relationship between the current value and the calorific value of the frame portion 61.

Moreover, the addition portion 210 adds the calorific value of the winding portion worked out by the winding portion heating operation portion 204 to the calorific value of the frame portion worked out by the frame portion heating operation portion 205, and thus exports a calorific value (second calorific value) of the part of the motor 3. Moreover, the motor anomaly judgment portion 212 is notified of the exported calorific value of the part of the motor 3.

The motor anomaly judgment portion 212 compares the notified calorific value of the motor 3 with a threshold (second threshold), and when it exceeds the threshold, judges that there is anomaly and notifies the output display portion 40 of the anomaly. More specifically, the threshold is divided into multiple stages, when it exceeds the initial threshold, a warning judgment is made, and when it exceeds the next threshold, a danger judgment is made. In addition, in this embodiment, the warning judgment and the danger judgment are together referred to as anomaly judgment.

Moreover, the part related to the servo driver 2 is further divided into a substrate portion 51 and a current value detection resistance portion 52 to work out a calorific value, and perform summation. This is undertaken by the detection resistance portion thermal resistance ratio multiplication portion 206, the detection resistance portion heating operation portion 207, the substrate portion thermal resistance ratio multiplication portion 208, the substrate portion heating operation portion 209 and the addition portion 211 shown in FIG. 3.

The detection resistance portion thermal resistance ratio multiplication portion 206 multiplies the calorific value worked out by the calorific value calculation portion 202 according to the current value worked out by the current value working-out portion 201 by a detection resistance portion thermal resistance ratio, and notifies the detection resistance portion heating operation portion 207 of the result. The so-called detection resistance portion thermal resistance ratio refers to a ratio of the current value detection resistance portion 52 to the whole of the substrate portion 51 and the current value detection resistance portion 52.

The detection resistance portion heating operation portion 207 works out a calorific value of the current value detection resistance portion 52 according to the current value obtained by multiplying the detection resistance portion thermal resistance ratio. More specifically, the calorific value is worked out by using a thermal model (a first thermal model, a current value detection resistance portion thermal model) indicating a relationship between the current value and the calorific value of the current value detection resistance portion 52.

The substrate portion thermal resistance ratio multiplication portion 208 multiplies the current value worked out by the current value working-out portion 201 by a substrate portion thermal resistance ratio, and notifies the substrate portion heating operation portion 209 of the result. The so-called substrate portion thermal resistance ratio refers to a ratio obtained by subtracting the detection resistance portion thermal resistance ratio from 1.

The substrate portion heating operation portion 209 works out a calorific value of the substrate portion 51 according to a current value obtained by multiplying the substrate portion thermal resistance ratio. More specifically, the calorific value is worked out by using a thermal model (a first thermal model, a substrate portion thermal model) indicating a relationship between the current value and the calorific value of the substrate portion 51.

Moreover, the addition portion 211 adds the calorific value of the current value detection resistance portion 52 worked out by the detection resistance portion heating operation portion 207 to the calorific value of the substrate portion 51 worked out by the substrate portion heating operation portion 209, and thus exports a calorific value (first calorific value) of the part of the servo driver 2. Moreover, the driver anomaly judgment portion is 213 is notified of the exported calorific value of the part of the servo driver 2.

The driver anomaly judgment portion is 213 compares the notified calorific value of the part of the servo driver 2 with a threshold (specified first threshold), when it exceeds the threshold, judges that there is anomaly and notifies the output display portion 40 of the anomaly. More specifically, the threshold is divided into multiple stages, when it exceeds the initial threshold, a warning judgment is made, and when it exceeds the next threshold, a danger judgment is made.

In addition, in this embodiment, the calorific value inference portion 20, an example in which the anomaly judgment portion 10 and the output display portion 40 monitoring the temperature are disposed in the servo driver 2 is described, but they may not be disposed in the servo driver 2. For example, the controller (PLC) 1 or any other external devices in communication connections with the servo driver 2 may also have the functions.

[Example of Judging the Calorific Value of the Motor 3]

For the part related to the motor 3, that is, the winding portion thermal resistance ratio multiplication portion 203 and the frame portion heating operation portion 205, a standardized current value is input, and thus, if an output from the addition portion 210 is set as "A" and the winding portion thermal resistance ratio is set as "K", a motor load rate may be expressed by dividing the output "A" by (1+K) obtained by adding "K" of the winding portion thermal resistance ratio multiplication portion 203 to "1" of the frame portion heating operation portion 205. That is, the motor load rate may be recorded as A/(1+K).

Moreover, for example, if the winding portion thermal resistance ratio is set as K=0.08, the motor load rate is 1.08/(1+0.08)=100(%) (in the case of the rated current).

Moreover, in the case that a load anomaly judgment formula is set as A/(1+K)>(winding portion allowable current rate)$^2$/(1+K), if the winding portion allowable current rate is "1.2", as $1.2^2$=1.44, when the value output from the addition portion 210 exceeds 1.44, that is, when the motor load rate is 1.44/(1+0.08)=1.33→133%, there is anomaly.

Also, in the case that the load anomaly judgment formula is set as A/(1+K)>(winding portion allowable current rate)$^2$/(1+K)×a warning notification level, if the warning notification level is 0.85, as 1.44×0.85=1.224, when the value output from the addition portion 210 is 1.224, that is, when the motor load rate is 1.224/(1+0.08)=1.13→113%, a warning notification will be made.

[Example of Judging the Calorific Value of the Servo Driver 2]

For the part related to the servo motor 2, that is, the detection resistance portion thermal resistance ratio multiplication portion 206 and the substrate portion thermal resistance ratio multiplication portion 208, a standardized current value is input, and thus, if an output from the addition portion 210 is set as "A" and the detection resistance portion thermal resistance ratio is set as "K", a driver load rate may be expressed by dividing the output "A" by (K'+(1−K')) obtained by adding "K'" of the detection resistance portion thermal resistance ratio multiplication portion 206 to "1−K'" of the substrate portion thermal resistance ratio multiplication portion 208. That is, the driver load rate may be recorded as A. For example, if the detection resistance portion thermal resistance ratio is K'=0.15, the driver load rate is (0.85+0.15)/(0.15+(1−0.15))=100(%) (in the case of the rated current).

Moreover, in the case that a load anomaly judgment formula is set as A>(driver portion current threshold rate)$^2$, if the winding portion allowable current rate of the motor 3 is "1.2", as $1.2^2$=1.44, when the value output from the addition portion 210 exceeds 1.44, that is, when the driver load rate is 144%, there is anomaly.

Also, in the case that the load anomaly judgment formula is set as A>(driver portion current threshold rate)$^2$×a warning notification level, if the warning notification level is 0.85, as 1.44×0.85=1.224, when the value output from the addition portion 210 is 1.224, that is, when the driver load rate is 122%, a warning notification will be made.

[Anomaly Judgment Processing Flow]

Figure 4:
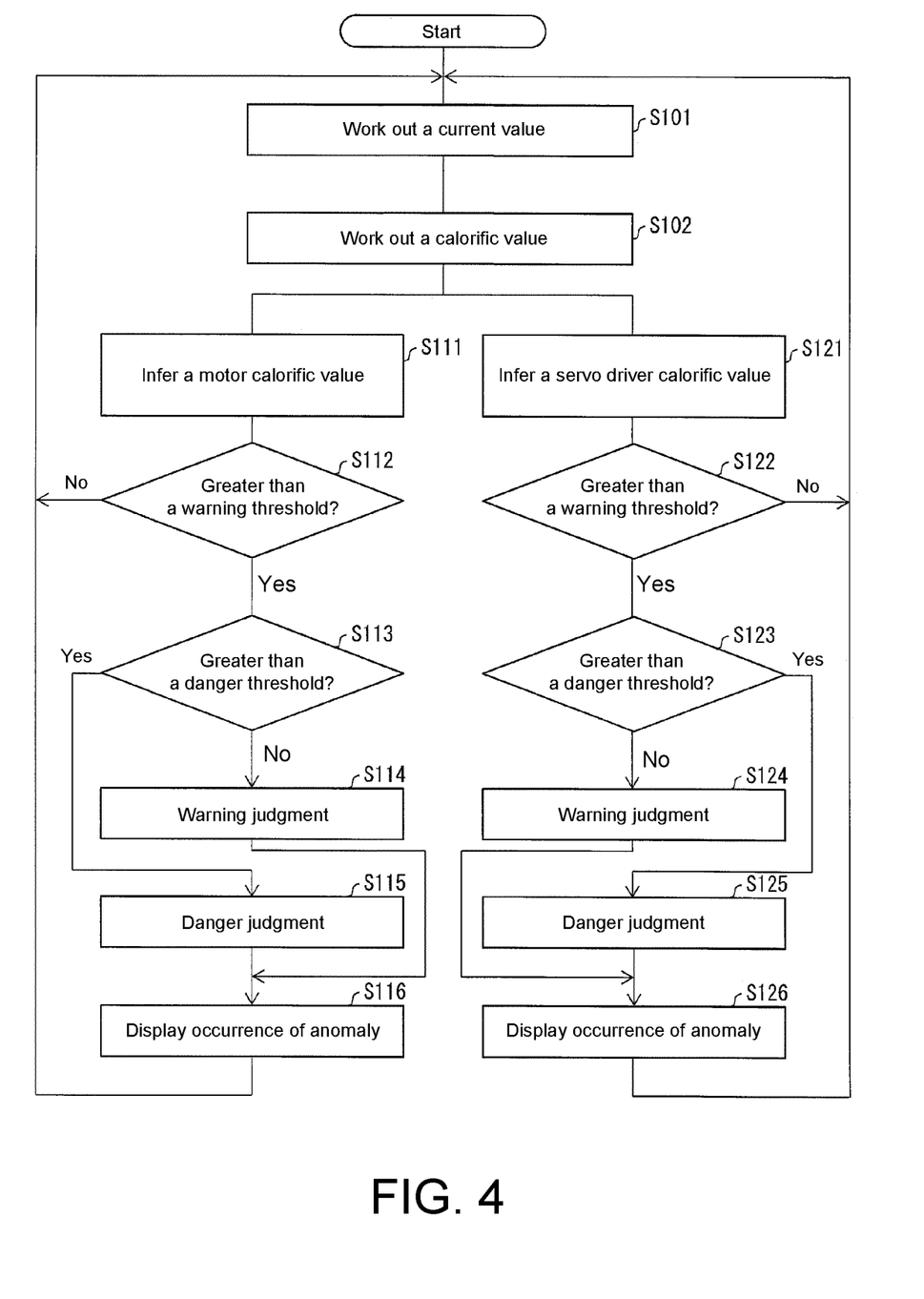
FIG. 4 is a flowchart of an anomaly judgment processing flow.

Next, an anomaly judgment processing flow is described with reference to FIG. 4. FIG. 4 is a flowchart of an anomaly judgment processing flow.

As shown in FIG. 4, when the current value working-out portion 201 works out a current value (S101) and the calorific value calculation portion 202 works out a current value (S102), processing of monitoring the calorific value of the motor 3 (S111) and processing of monitoring the calorific value of the servo driver 2 (S121) are performed in parallel. In the processing of monitoring the calorific value of the motor 3, firstly, the motor anomaly judgment portion 212 judges whether a value obtained by adding the calorific value worked out by the winding portion heating operation portion 204 to the calorific value worked out by the frame portion heating operation portion 205 exceeds a warning threshold (S112). Moreover, in the case of exceeding the warning threshold (YES in S112), whether it exceeds a danger threshold is judged (S113), if it does not exceed the danger threshold (NO is S113), it is a warning judgment (S114), and the output display portion 40 displays the intention (S116). Moreover, in step S113, if it exceeds the danger threshold (YES in S113), it is a danger judgment (S115), and the output display portion 40 displays the intention (S116).

Also, in the processing of monitoring the calorific value of the servo driver 2 (S121), firstly, the driver anomaly judgment portion 213 judges whether a value obtained by adding the calorific value worked out by the detection resistance portion heating operation portion 207 to the calorific value worked out by the substrate portion heating operation portion 209 exceeds a warning threshold (S122). Moreover, in the case of exceeding the warning threshold (YES in S122), whether it exceeds a danger threshold is judged (S123), and if it does not exceed the danger threshold (NO in S123), it is a warning judgment (S124), and the output display portion 40 displays the intention (S126). Also, in step S123, if it exceeds a danger threshold (YES in S123), it is a danger judgment (S125), and the output display portion 40 displays the intention (S126).

Varying Example

Figure 5:
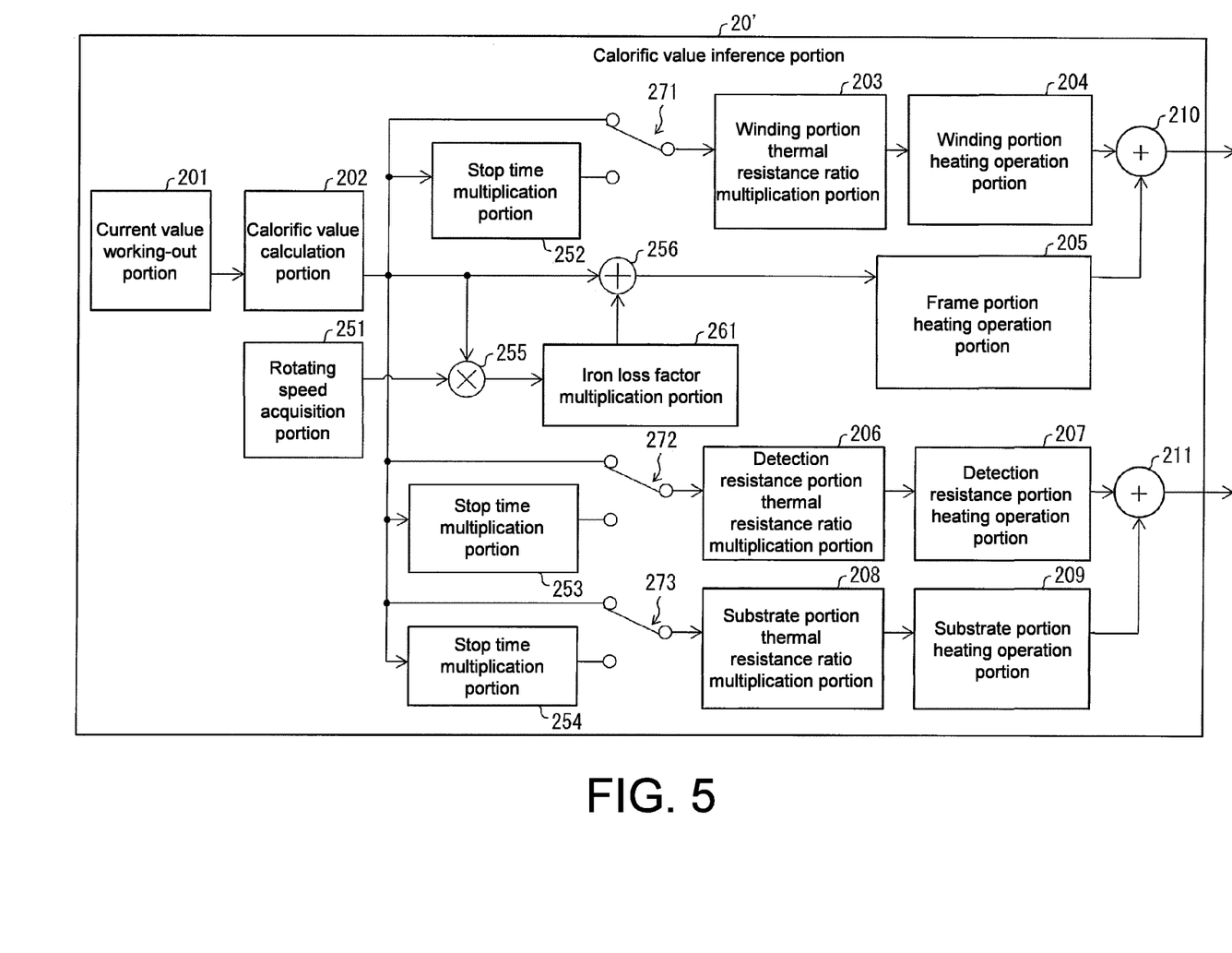
FIG. 5 is a diagram of a varying example.

Next, a varying example of the present invention is described with reference to FIG. 5. FIG. 5 is a diagram for describing the varying example of the present invention. In this varying example, a calorific value inference portion 20' shown in FIG. 5 is included in place of the calorific value inference portion 20. The calorific value inference portion 20' is different from the calorific value inference portion 20 in that it includes a rotating speed acquisition portion 251, stop time multiplication portions 252-254, an iron loss factor multiplication portion 261 and switches 271-273.

In this varying example, the calorific value of the frame portion 61 is worked out by multiplying the iron loss factor multiplication portion 261 by an iron loss factor according to the rotating speed of the motor 3 acquired by the rotating speed acquisition portion 251. Thus, the calorific value of the frame portion 61 can be worked out appropriately. Moreover, when the detection speed is below a specified value (e.g., 15 Hz), the switches 271-273 are controlled to switch the switches 271-273 to a lower side (i.e., at the side of the stop time multiplication portions 252-254).

For example, in the case that the motor 3 is a three-phase AC motor, when the rotating speed of the motor is below a specified value, i.e., substantially stops, sometimes the current only flows through one particular phase but does not flow through other phases. At this point, the calorific value worked out only according to the current value acquired simply is on the premise of flowing through three phase equally, and thus in the case that the current actually only flows through one phase, it may not be an appropriate value worked out.

In this varying example, in this case, by switching the switches 271-273, calorific values of the portions can be worked out by multiplying the calorific value worked out according to the current value in the stop time multiplication portions 252-254, which can thus be properly dealt with.

In addition, for example, "×2" in the stop time multiplication portion 252, a value obtained by adjusting a resistance adjustment value by measurement can be used in the stop time multiplication portion 253, and a value obtained by adjusting a substrate adjustment value by measurement can be used in the stop time multiplication portion 254.

(Embodiment by Means of Software)

Control blocks of the servo driver 2 (especially the anomaly judgment portion 10, the calorific value inference portion 20 and the motor control portion 30) can be implemented by a logic circuit (hardware) formed on an integrated circuit (IC chip) or the like, and may also be implemented by software by using a Central Processing Unit (CPU).

In the latter situation, the servo driver 2 has a CPU that executes a command of software, i.e., program, which implements various functions, a Read Only Memory (ROM) or storage devices (which are referred to as "recording medium") recording the program and various data that can be read by a computer (or CPU), and a Random Access Memory (RAM) expanding the program, etc. Moreover, the objective of the present invention is achieved by reading and executing the program from the recording medium by the computer (or CPU). As the recording medium, "non-temporary tangible medium" can be used, for example, a tape, a disk, a card, a semiconductor memory, a programmable logic circuit and the like can be used. Moreover, the program may also be provided to the computer via any transmission medium (communication networks or broadcast waves, etc.) that can transmit the program. In addition, the present invention can also be implemented in the form of data signals instantiating the program and embedded into carriers through electronic transmission.

The present invention is not limited to the various implementations, various changes can be made within the scope indicated in the claims, and implementations obtained by properly combining technical components disclosed in different implementations respectively are also included in the technical scope of the present invention.

What is claimed is:

1. A temperature monitoring device, monitoring a temperature of a motor control device that controls an action of a motor, wherein the temperature monitoring device comprises:
    a current value acquisition portion that acquires a current value supplied for the motor, wherein the temperature monitoring device is disposed in the motor control device, and the current value acquisition portion comprises a substrate portion and a current value detection resistance portion acquiring the current value according to a measured value obtained by measuring a power line through which the motor control device supplies power for the motor;
    a calorific value inference portion that infers a calorific value of the motor control device through a first thermal model as a first calorific value, the first thermal model indicating a relationship between the current value and the calorific value of the motor control device; and
    an anomaly judgment portion that compares the first calorific value inferred by the calorific value inference portion with a specified first threshold, so as to judge whether the motor control device has heating anomaly, wherein the first thermal model comprises: a thermal model of a relationship between the current value and a calorific value of the current value detection resistance portion in the motor control device, and a thermal model of a relationship between the current value and a calorific value of the substrate portion disposed around the current value detection resistance portion, the calorific value inference portion comprises:
    a stop time multiplication portion;
    a substrate portion thermal resistance ratio multiplication portion; and
    a switch,
    wherein when a speed of the motor is below a specified value, the switch is controlled to connect the thermal resistance ratio multiplication portion with the stop time multiplication portion, to obtain a calorific value of the substrate portion by multiplying a calorific value worked out according to a current value in the stop time multiplication portion by a substrate portion thermal resistance ratio.

2. The temperature monitoring device according to claim 1, wherein
    the calorific value inference portion further infers a calorific value of the motor through a second thermal model as a second calorific value, the second thermal model indicating a relationship between the current value and the calorific value of the motor, and
    the anomaly judgment portion compares the second calorific value inferred by the calorific value inference portion with a specified second threshold, so as to further judge whether the motor has heating anomaly.

3. The temperature monitoring device according to claim 1, further comprising:
    an output portion that outputs information generated by the heating anomaly when the anomaly judgment portion judges that the heating anomaly exists.

4. The temperature monitoring device according to claim 1, wherein
    a cycle of acquiring the current value by the current value acquisition portion is shorter than that of making judgment in the anomaly judgment portion.

5. The temperature monitoring device according to claim 1, wherein
    the specified first threshold is divided into multiple stages, and the anomaly judgment portion judges whether the motor control device has the heating anomaly in each stage.

6. The temperature monitoring device according to claim 2, wherein
    the second thermal model comprises: a thermal model of a winding portion in the motor, and a thermal model of a frame portion of the motor.

7. A temperature monitoring method, comprises:
    disposing a temperature monitoring device in a motor control device that controls an action of a motor, wherein the temperature monitoring device monitors a temperature of the motor control device, the temperature monitoring device comprises a substrate portion and a current value detection resistance portion;
    a current value acquisition step of acquiring a current value supplied for the motor by using the substrate portion and the current value detection resistance portion according to a measured value obtained by measuring a power line through which the motor control device supplies power for the motor;
    a calorific value inference step of inferring a calorific value of the motor control device through a first thermal model as a first calorific value, the first thermal model indicating a relationship between the current value and the calorific value of the motor control device;
    an anomaly judgment step of comparing the first calorific value inferred in the calorific value inference step with a specified first threshold, so as to judge whether the motor control device has heating anomaly,
    wherein the first thermal model comprises: a thermal model of a relationship between the current value and a calorific value of the current value detection resistance portion in the motor control device, and a thermal model of a relationship between the current value and a calorific value of the substrate portion disposed around the current value detection resistance portion, the calorific value inference step comprises a step of, when a speed of the motor is below a specified value, controlling a switch to connect a thermal resistance ratio multiplication portion with a stop time multiplication portion to obtain a calorific value of the substrate portion by multiplying a calorific value worked out according to a current value in the stop time multiplication portion by a substrate portion thermal resistance ratio.

8. A non-transitory storage medium storing an information processing program, for causing a computer to function as the temperature monitoring device which monitors a temperature of a motor control device that controls an action of a motor, wherein the information processing program is configured to implement steps comprising:
- a current value acquisition step of acquiring a current value supplied for the motor by using a substrate portion and a current value detection resistance portion according to a measured value obtained by measuring a power line through which the motor control device supplies power for the motor, wherein the temperature monitoring device is disposed in the motor control device, and the temperature monitoring device comprises the substrate portion and the current value detection resistance portion;
- a calorific value inference step of inferring a calorific value of the motor control device through a first thermal model as a first calorific value, the first thermal model indicating a relationship between the current value and the calorific value of the motor control device;
- an anomaly judgment step of comparing the first calorific value inferred in the calorific value inference step with a specified first threshold, so as to judge whether the motor control device has heating anomaly, wherein the first thermal model comprises: a thermal model of a relationship between the current value and a calorific value of the current value detection resistance portion in the motor control device, and a thermal model of a relationship between the current value and a calorific value of the substrate portion disposed around the current value detection resistance portion, the calorific value inference step comprises a step of, when a speed of the motor is below a specified value, controlling a switch to connect a thermal resistance ratio multiplication portion with a stop time multiplication portion to obtain a calorific value of the substrate portion by multiplying a calorific value worked out according to a current value in the stop time multiplication portion by a substrate portion thermal resistance ratio.

* * * * *